United States Patent
Burgess et al.

(10) Patent No.: US 10,859,435 B2
(45) Date of Patent: Dec. 8, 2020

(54) METHOD AND APPARATUS FOR DETECTING A LASER

(71) Applicant: THE SECRETARY OF STATE FOR DEFENCE, Salisbury (GB)

(72) Inventors: Christopher David Burgess, Salisbury (GB); Sean Michael Tsi-Ong Tipper, Salisbury (GB)

(73) Assignee: The Secretary of State for Defence, Salisbury (GB)

( * ) Notice: Subject to any disclaimer, the term of this patent is extended or adjusted under 35 U.S.C. 154(b) by 0 days.

(21) Appl. No.: 16/468,730

(22) PCT Filed: Dec. 12, 2017

(86) PCT No.: PCT/GB2017/000178
§ 371 (c)(1),
(2) Date: Jun. 12, 2019

(87) PCT Pub. No.: WO2018/109424
PCT Pub. Date: Jun. 21, 2018

(65) Prior Publication Data
US 2020/0064185 A1 Feb. 27, 2020

(30) Foreign Application Priority Data
Dec. 16, 2016 (GB) .................................. 1621450.4

(51) Int. Cl.
*G01J 1/42* (2006.01)
*G01J 1/04* (2006.01)
(Continued)

(52) U.S. Cl.
CPC ........... *G01J 1/4257* (2013.01); *G01J 1/0411* (2013.01); *G01J 1/0448* (2013.01); *G01S 3/78* (2013.01); *H04N 5/2254* (2013.01)

(58) Field of Classification Search
None
See application file for complete search history.

(56) References Cited

U.S. PATENT DOCUMENTS

| 2005/0206874 A1 | 9/2005 | Dougherty |
| 2015/0138355 A1* | 5/2015 | Tillotson ............. G08G 5/0052 348/144 |

(Continued)

FOREIGN PATENT DOCUMENTS

| GB | 2250881 A | 6/1992 |
| GB | 2281833 A | 3/1995 |

OTHER PUBLICATIONS

Dong et al., "Non-iterative spot center location algorithm based on Gaussian for fish-eye imaging laser warning system," Optik, 2012, pp. 2148-2153, vol. 123, No. 23, Elsevier GmbH.

(Continued)

*Primary Examiner* — Hung Q Dang
(74) *Attorney, Agent, or Firm* — Dean W. Russell; Kilpatrick Townsend & Stockton LLP

(57) ABSTRACT

A laser detector apparatus (1) is provided, where a pixel array (3) is arranged behind a lens arrangement (4) such that distant objects (9) (in general, those at infinity) are out of focus at the pixel array. The image from the pixel array is evaluated by a computer processor (6) to detect such out of focus images which will be of a known size and shape (generally circular spots of known width). This can enable distant laser threats to be readily distinguished from nearby bright objects (10), whilst also protecting the pixel array from powerful laser sources (because the laser energy is not focussed to a point, on the pixel array it is less likely to damage the pixel array). It can also enable the wavelength of the laser to be accurately determined from the ratio of colours in the image of the laser spot, because it will typically not be a saturated image. The apparatus and (Continued)

method are particularly suitable for identifying and distinguishing laser sources across a wide range of brightnesses, and is also suitable for detecting and distinguishing multiple laser sources.

11 Claims, 4 Drawing Sheets

(51) Int. Cl.
    *G01S 3/78* (2006.01)
    *H04N 5/225* (2006.01)
    *G06K 9/20* (2006.01)
    *G06K 9/46* (2006.01)
    *G01S 7/48* (2006.01)
    *G06K 9/00* (2006.01)
    *H04N 7/18* (2006.01)

(56) References Cited

U.S. PATENT DOCUMENTS

2015/0195495 A1* 7/2015 McEwan ............... H04N 7/188
                                                          348/144
2019/0107656 A1* 4/2019 Black ........................ E06B 5/18

OTHER PUBLICATIONS

International Patent Application No. PCT/GB2017/000178, International Search Report and Written Opinion dated Mar. 6, 2018, 12 pages.
United Kingdom Patent Application No. GB1720459.5, Search Report dated Jun. 6, 2018, 4 pages.
International Patent Application No. PCT/GB2017/000178, International Preliminary Report on Patentability dated Jun. 27, 2019, 9 pages.

* cited by examiner

METHOD AND APPARATUS FOR DETECTING A LASER

The present invention relates to a method and apparatus for detecting a laser. And is particularly suited to identifying a threat to safety, such as when a laser is pointed towards an aircraft.

It has previously been proposed to use a sensor array and image processor to detect laser events, as is described in WO2014016546. This is suited to detecting civilian laser pointers by collecting evidence (a picture) to assist with law enforcement prosecution, however it is less suited to cope with both low and high power lasers because low power lasers may not be detected and high power lasers are likely to damage the sensor.

It is therefore an object of the present invention to provide a laser detector which is suited to detecting both low and high power lasers.

According to a first aspect of the present invention there is provided a laser detector comprising:
  A forward facing array of sensor elements, and a lens arrangement positioned in front of the sensor array;
  A computer processor arranged to receive image data from the sensor array and to determine from the received data the presence of light from a laser source, based at least in part on the brightness of pixels in the image data;
  Characterised in that:
  The lens arrangement is positioned relative to the array of sensor elements such that:
    any substantially point-like distal light sources give rise to a characteristic out of focus image in the plane of the array of sensor elements; and
    any substantially point-like proximal light sources give rise to a different image in the plane of the array of sensor elements; and
  The computer processor is arranged to process the received image data to detect distal laser light sources by identifying the characteristic out of focus image in the image data, and to substantially disregard different images and their associated light sources.

This has the advantage that even relatively low power laser sources aimed towards a user from a great distance can be distinguished from other light sources presenting a comparable amount of light energy to the lens area (e.g. bright lights on an airport run-way), thus enabling a possible threat to be detected with less risk of causing false alarms due to nearby light sources. Furthermore, as the laser light is spread out over a larger area of the sensor array than if it was in focus, it may become possible to measure the wavelength of the laser using a bayer type sensor (with different regions devoted to different wavebands) directly without resorting to estimations based on the sensor area around and outside of the focused spot, which provides for greater reliability and/or measurement greater accuracy.

The term "any substantially point-like distal light sources" relates to light, sources located substantially at optical infinity with respect to, and in front of the lens arrangement and which from such viewpoint are substantially point-like. The term "any substantially point-like proximal light sources" relates to light sources which are closer than substantially optical infinity with respect to, and in front of the lens arrangement and which from such viewpoint are substantially point-like. The term 'substantially at optical infinity' relates to the situation where incoming light rays are substantially parallel. The distinction between distal and proximal depends on the lens system utilised and the choice of image sizes to detect and disregard, however it implies that the construction of the laser detector is such as to define a boundary between distal and proximal distances. The skilled person will be able to select a suitable distance, which might be any distance that suits the intended usage scenario but as an example might optionally be any value between 1 m (E.g. for a very small lens), and 1 km (E.g. for a very large lens), but for typical applications might be around 10 m to around 100 m.

The term pixel relates to an element of an image defined by the image data. A pixel may be formed by a single sensor element, or may be derived from multiple neighbouring sensor elements (e.g. as a bayer pattern) as is known in the art. The term "substantially disregard" means that for the purposes of the aforesaid laser detection images substantially differing (e.g. particularly in size or shape rather than in colour) from the characteristic out of focus image, are treated as not being indicative of a distal laser, however it is possible that these images may be used for other purposes. The amount of difference required for the image to be treated as different is a matter that the skilled person can select to optimise the apparatus for a desired level of correct detections and desired avoidance of false positives, based on a minimal amount of trial and error.

While it is conventional to focus the light sources that are of interest so that they can be readily identified, this approach differs by focusing the light sources that are not of interest, and defocusing those that are of interest.

WO2014016546 teaches that a good way to determine the brightness and colour of a laser is to identify a spot of saturated pixels, and to assess the brightness and colour of pixels surrounding the bright spot. Since the brightness laser dazzle decreases away from the saturated pixel area in a characteristic way, the brightness of the laser can be calculated, while the colour of the image in the pixels adjacent to the bright spot enables a determination of the colour of the laser.

By contrast, with the present invention distant lasers give rise to a characteristic de-focussed shape (E.g. a circular spot) caused by the lens arrangement, rather than being focused to a point and only considering light that has been diffracted away from the point image.

According to a second aspect of the present invention there is provided a method of detecting a laser comprising the steps of:
  Providing a forward facing array of sensor elements, and a lens arrangement positioned in front of the sensor array;
  Providing a computer processor and controlling the computer processor to receive image data from the sensor array and to determine from the received data the presence of light from a laser source, based at least in part on the brightness of pixels in the image data;
  Characterised in that:
  The lens arrangement is positioned relative to the array of sensor elements such that:
    any substantially point-like distal light sources give rise to a characteristic out of focus image in the plane of the array of sensor elements; and
    any substantially point-like proximal light sources give rise to a different image in the plane of the array of sensor elements; and
  The computer processor is controlled to process the received image data to detect distal laser light sources by identifying the characteristic out of focus image in the image data, and to substantially disregard different images and their associated light sources.

Preferably the lens arrangement is arranged to provide an out of focus image at the sensor array from light sources at substantially optical infinity, and to provide an in-focus image at the sensor array from proximal light sources at a predetermined proximal distance.

Alternatively the lens arrangement is arranged to provide an out of focus image at the pixel array sensor from light sources at substantially optical infinity, and to provide an even more out of focus image at the pixel array from more proximal light sources.

In a typical embodiment the characteristic image shape is substantially a circular spot (a term that covers a variety of substantially circularly symmetric point-spread functions, such as an airy function). The size of the characteristic image shape needs to span at least two pixels (i.e. at least two pixel high and/or wide) in order to present an image within the image data—and generally will span at least four pixels, and typically should span at least eight pixels. Spanning several pixels is important because it enables the computer processor to distinguish the shape from other shapes more easily and because it reduces the effect of high power lasers that might otherwise damage or disable the sensor.

When the characteristic image shape is recorded by the pixel array sensor it will generally be a pixelated version of the characteristic image shape, such as a pixelated circle (which in an extreme case could be recorded as a four pixel square, however preferably the size of the image is selected such that its size can be measured in pixels to a suitable accuracy). Generally the characteristic image shape (e.g. circular spot) is of a characteristic size enabling it to be distinguished from shapes of other sizes. In one example embodiment the characteristic image shape is a circular spot 50 pixels in diameter.

With fisheye lenses the image shape may have some degree of fisheye distortion (which towards the edges of the image would generally cause a circular spot to have a slightly oval shape). If this effect is very significant then an anti-fisheye distortion filter may be applied by a computer processor to the image before the computer processor identifies the characteristic image shape in the image data.

There may also be a large degree of polygonal distortion due to the influence of a non-circular lens aperture. This is often the case if a small aperture is used. If a mirrored lens (catadioptric) lens system is used the shape (e.g. spot) may be hollow rather than filled. If these effects are minor then in the image is considered substantially a circular spot.

Advantageously the laser detector, based on:
The optical density of the lens arrangement,
The lens aperture diameter, and
The sensor efficiency, and the size and light gathering capacity of its sensor elements,
The image bit depth and any ISO applied,
Provides for collection of a digital image whereby even when viewing a daylit scene (i.e. surfaces with a luminance of 10 kcd/m$^2$) substantially the whole digital image is recorded at below 10% of the image bit depth, preferably below 1% of the image bit depth, more preferably at a value of zero.

Typically these factors provide for collection of a digital image whereby even when viewing a low Pressure sodium-vapour lamp (i.e. surfaces with a luminance of 75 kcd/m$^2$) substantially the whole digital image (including that part representing the lamp) is recorded at below 10% of the image bit depth, preferably below 1% of the image bit depth, more preferably at a value of zero.

This has the advantage that very few objects other than laser threats will be detected (generally, nearby very bright objects, and the sun), and it is then only necessary to distinguish those objects from lasers. This can be achieved readily because nearby bright objects will present a different image due to being focused differently from distant laser threats, while the sun will present a different image due to not being a point object.

Advantageously the image is converted to or provided as a binary image, or converted by a/the computer processor into a binary image whereby pixels above a threshold are provided as a logical 1, and pixel, below the threshold are provided as a logical 0 (or vice versa). This has the advantage of requiring less processor time (or a less powerful processor, and/or less energy) to process the image and detect the laser. Typically the value chosen is between 0 and 1. So where a conventional image sensor is used which outputs pixel values between 0 and 256, anything above 0 is converted to 1.

Use of such a low threshold (and associated parameters ensuring that typical scenes cause an output below that threshold) is advantageous because whilst low power lasers can be identified reliably, high powered lasers are unlikely to damage or disable the sensor (and due to being out of focus, the potency of distant laser sources is reduced which contributes to them being less likely to damage or disable the sensor).

Preferably a filter is included providing an optical density equivalent to at least ND2, more preferably at least ND4, most preferably at least ND6. (and optionally at least ND8). By relying predominantly on an optically dense filter, less reliance must be placed on a short exposure time as this does not reliably avoid oversaturation of sensor elements (or indeed on modifications to conventional pixel array sensors to make them less sensitive as this would be very costly).

Using a typical miniature camera, an ND6 filter was found to be advantageous. The use of a small or miniature camera (maximum lens diameter of less than 2 cm, preferably less than 1 cm, more preferably less than 1.0 cm, more preferably less than 0.6 cm) is advantageous as this reduces the size and weight of the camera whilst also contributing to the goal of capturing less light. The lens diameter is generally greater than 0.1 mm and typically greater than 1 mm.

The amount of defocusing of objects at optical infinity should be selected to balance the needs to ensure that modest brightness lasers are detected, whilst ensuring that even very bright lasers do not cause saturation of sensor elements in the pixel array sensor. The resolution (or used resolution) of the pixel array sensor is optionally High Definition (720p or 1080p) or may be VGA (480×600). VGA is a preferred choice because it can be recorded easily at high frame rates, it provides for simpler image analysis which enables high speed processing, the amount of defocusing can be selected to give rise to circular laser spots (or other shapes, depending on the lens configuration) that can be readily identified by an algorithm in a VGA video feed, and most commercially available camera sensors offer image/video capture at this resolution. The sensor may or may not 'bin' it's pixel sensor elements, for example using four (or more) sensor elements as if they were one sensor element.

A high frame rate is preferred—preferably at least 40 frames per second, more preferably at least 60 frames per second. This is advantageous because common laser threats (for example those seen by commercial airline and helicopter pilots) are commonly handheld laser pens, which typically will be seen to flash only very briefly as the beam is waved in the direction of the camera. Therefore a high frame rate will be useful in identifying and characterizing the intensity and colour of the brief flash. A slow frame rate (assuming a long exposure is used, such as $\frac{1}{10}^{th}$ of a second) may lead to a slightly less accurate colour measurement and a gross underestimate of the laser intensity.

When used with a conventional lens that gives rise to a circular defocused laser spot, a readily available circle-identifying algorithm can be used, which makes the approach easy to implement. The identification of the characteristic shape (E.g. a circular spot) can be performed most simply when the image data is first filtered to a binary image. The image data is processed using a computer processor to determine areas of the image which are not likely to be laser light, and areas of the image which are likely to be laser light (e.g. based on intensity, or more generally based on any combination of range t source, angular subtense, chromacity and intensity). The binary image is then processed by the computer processor to detect the characteristic shape (e.g. circular spot). This approach can provide for high speed real-time analysis, even at high frame rates, and without requiring a powerful processor.

As a result, laser threats can be very quickly identified (e.g. particularly in a single inter-frame period) and their colour can be accurately categorised, while also reliably distinguishing them from proximal bright non-laser light sources (such as a flashlight or aircraft navigation light), and while also providing for such detection/measurement across a wide range of laser brightnesses (from very modest brightness threats to very bright threats).

Appropriate calibration of the pixel array sensor enables calculation of the laser wavelength with reasonably high accuracy. This accuracy is valuable because while previously there were only a limited number of commonly available laser wavelengths, in recent years that number has started increasing.

Optionally, the lens arrangement includes a colour splitter (comprising either a prism, or a diffraction grating). The colour splitter is arranged such that white light (in the sense of a substantially continuous spectrum of wavelengths, not necessarily the colour white) sources will present a colour-smeared image, whilst substantially single wavelength light sources will present the characteristic image. This has the advantage of further assisting the computer processor in distinguishing laser threats from bright non-laser sources such as the sun.

An additional advantage is that multi-wavelength laser sources (often a device comprising multiple lasers of different colours directed in the same direction, but sometimes it could be a multi-wavelength laser) will present multiple instances of the characteristic image, and the colours of these images, and/or their separation(s) on the sensor can be assessed by the computer processor to determine the wavelengths present in the laser source.

A preferred embodiment will now be described, by way of example only, with reference to the figures in which.

Figure 1:
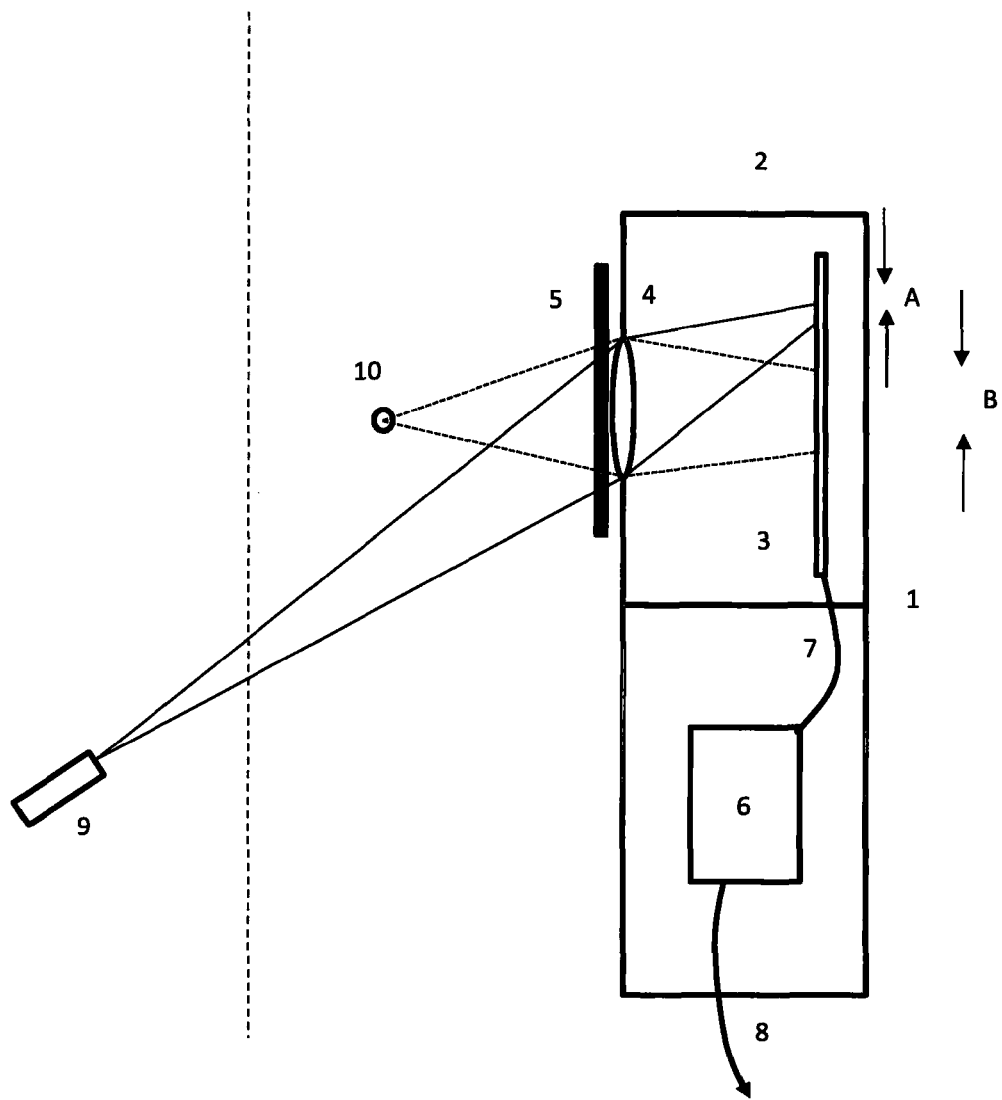
FIG. 1 is a diagram of an embodiment of the invention where a distant laser source is distinguished from a proximal non-laser source.

Referring to FIG. 1, a laser detector 1 comprises a camera 2 with a sensor 3 arranged behind a lens arrangement 4, and neutral density light filter 5, and the detector comprises a computer processor 6 which receives image data from the sensor 3 via a cable 7, and outputs a detection 8 of a laser 9 but is not triggered to output a detection by a proximal non-laser light source 10.

Light from the laser source 9 and non-laser light source 10 are directed towards the camera and are partially focused towards the sensor: A vertical dotted line indicates a distinction between two regions: proximal and distal. In the distal region any objects will be, from an optical focusing perspective at 'infinity', although this is a simplification of course. In the proximal region any object will be close enough that if the camera was originally focused to infinity it would require an adjustment of the camera focus to bring these proximal objects into focus.

The focal length of the lens is such that nothing is in focus in the plane of the sensor. Effectively it is focused 'beyond' infinity meaning that it will not bring even parallel light rays to focus at the sensor. As a result the light from the laser source 9 gives rise to a characteristic image at the sensor, which in this embodiment is a circular spot (a filled circle) of width A. The image is circular because the lens arrangement permits a column of light through that is circular in cross section. If an aperture was used this may have a non-circular (e.g. a polygonal) shape, resulting in a corresponding polygonal characteristic shape.

The non-laser source 10 is proximal to the camera (which might be for example a navigation light of an aircraft near to the camera on an airport runway) and due to this proximity it gives rise to an image on the sensor which is not the characteristic image. While it may or may not also be a circular spot, it will be wider (in this embodiment) than the characteristic image and thus can be distinguished as not being due to a laser source. As shown in FIG. 1 the width of this image is B, which is greater than that arising from the laser source.

The camera lens 4 is provided with a neutral density filter 5 such as an ND6 filter which provides an optical density of 6, which attenuates light by a factor of 1, million. This, along with other aspects of the camera such as its aperture and frame rate are selected so that typically the image sensor will output an entirely black image (a value of zero for all pixels). The amount by which objects at optical infinity will be out of focus is selected to cause a characteristic image (e.g. filled circle) small enough that relatively low powered lasers (laser pens) will be detectable, but large enough that the circle can be readily distinguished using an efficient (I.e. fast) algorithm from other shapes (e.g. larger or smaller circular spots), and also large enough that the energy from high powered lasers will be distributed over a sufficient area of the sensor that the sensor is unlikely to be damaged or disabled.

The computer processor 6 is configured to control the sensor to operate at a predetermined frame rate, such as 40 frames per second. A high frame rate is useful to detect hand-held laser-threats which tend to flicker very quickly.

Figure 2:
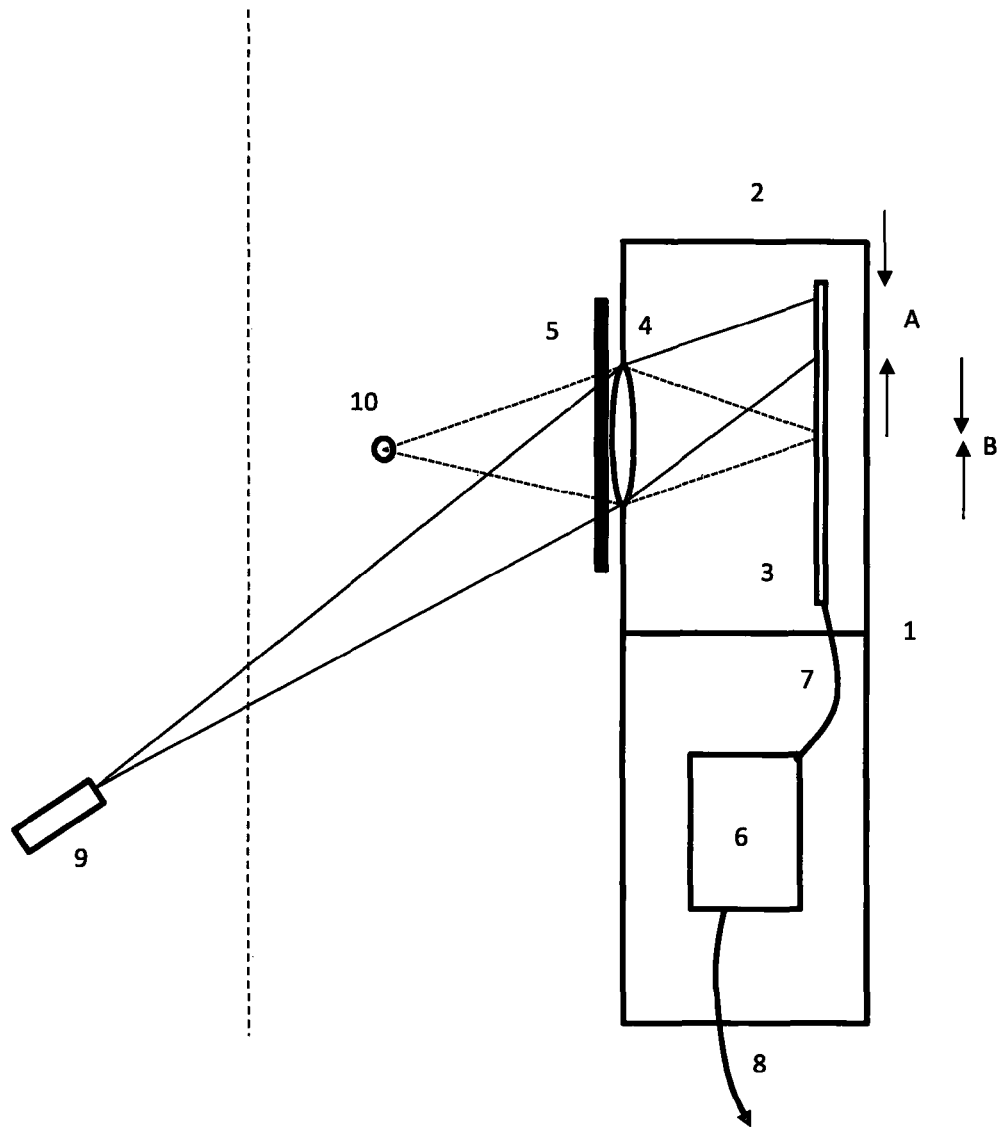
FIG. 2 is a diagram of a second embodiment of the invention where the camera is differently focused as compared to in FIG. 1.

Turning to FIG. 2, a similar embodiment is shown albeit with the proximal object 10 being nearly in focus, while the distal object 9 is more strongly defocused than it was in the FIG. 1 embodiment.

The advantage of the previous FIG. 1 embodiment, where the proximal objects are more strongly defocused, is that it essentially impossible that a round (as viewed from the lens) nearby object could give rise to the characteristic image, and even if they were to do so the brightness of that image would be correspondingly lower (due to the light being more spread out) and so such proximal object are less likely to register above the detection threshold of the sensor.

An advantage of the FIG. 2 embodiment, where the distal objects are more strongly defocused is that it provides greater resilience to the sensor from high powered lasers. Additionally, the size of the image generated is less sensitive to the distance of the distal object, so a difference between 1 km and 10 km would change the size of the resulting image by an insignificant fraction. Whereas in the FIG. 1 embodiment the resulting image would change by a large—albeit typically still very small—fraction, and this needs to be accounted for in the design and implementation of the image detecting algorithm.

Figure 3:
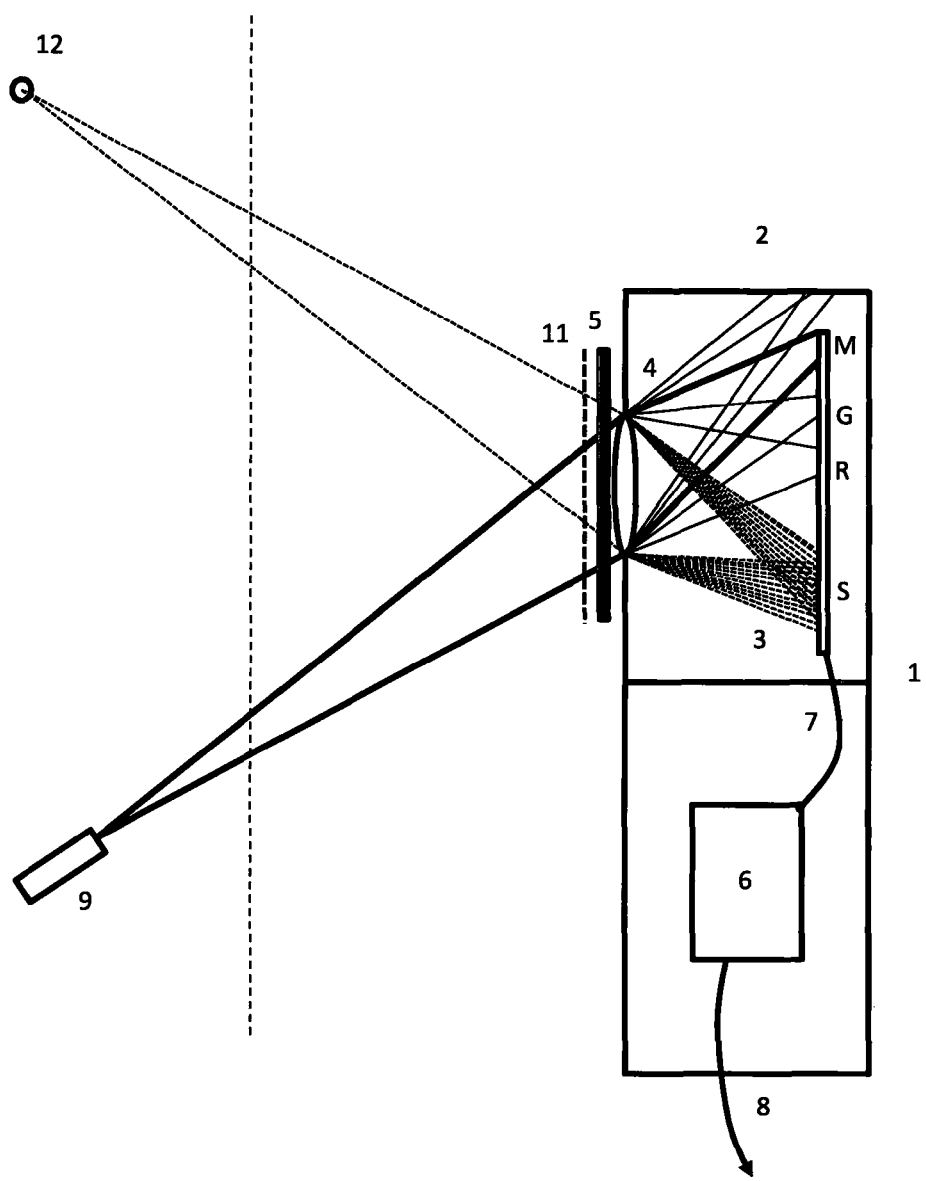
FIG. 3 is a diagram of an embodiment of the invention where a distant laser source is distinguished from a distant non-laser source.

Turning to FIG. 3 an embodiment is illustrated that is similar to that of FIG. 1 albeit with the addition of a colour splitter 11 in the form of a diffraction grating.

In this example distal laser source 9 is a dual colour laser source, generating a beam with both red and green light in parallel. Another distal source is present, non-laser source 12.

When the light from the various sources passes through the diffraction grating some of the light is refracted by an amount that depends on its wavelength. In this example some of the laser light passes straight through the diffraction grating and is partially focused by the lens to generate a mixed colour image M, some of the green laser light is deflected a first amount to generate a green image G and some of the red light is deflected a second amount to generate a red image R. The separation of the red and green images R, G from the mixed image M allows a more accurate determination of their wavelengths than mere use of a traditional bayer type sensor to estimate the colour of the image. There will also be additional images on the other side of the mixed colour image provided that this light falls onto the sensor (in this particular example it doesn't).

By contrast the light from the non-laser source 12 contains a spectrum of wavelengths, which gives rise to a smeared image S. This can be readily distinguished from the discrete images generated by the laser source so the non-laser source can be identified as such.

Figure 4:
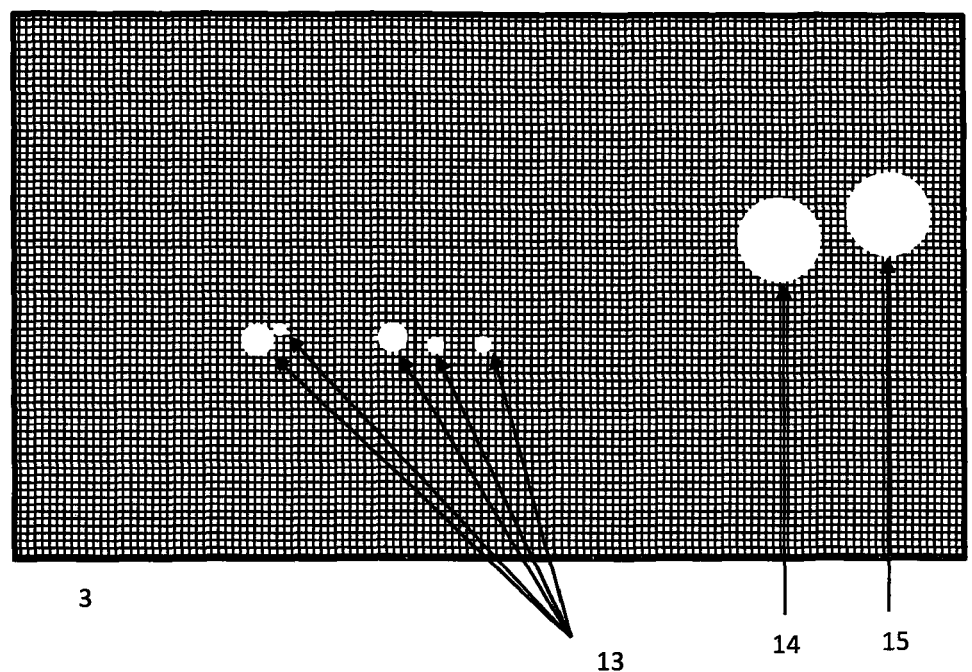
FIG. 4 is an illustration of a pixel array sensor (grid) with an image formed on it (white) from nearby non-laser sources and from a distant laser source.

Turning to FIG. 4 as sensor array 3 is illustrated as a rectangular grid. Several bright spots impinge on the sensor array 3 to form (typically circular spots) on the sensor, which would be read and translated by the computer processor into an image with respective bright spots. Several bright spots, 13 are shown to the left of the figure which are due to various proximal non-laser sources. The size of these bright spots is not large enough to indicate that they are due to a distant laser source. Two bright spots, 14, 15 to the right, are present which are of a larger diameter. These have the same diameter as each other and this diameter matches the expected diameter of a point light source at a distance (optically at infinity, but in practice greater than 100 m, more typically greater than 1 km). The computer processor identifies two circular spots of width equal to the required size and detects that these are caused by a distant laser source. As the images are (typically) not saturated, it is possible to readily evaluate their intensity/brightness, and ratio of colours from which the laser wavelength can generally be determined.

More generally, a laser detector apparatus and method are provided, where a pixel array is arranged behind a lens arrangement such that distant objects (In general, those at optical infinity) are out of focus at the pixel array. The image from the pixel array is evaluated by a computer processor to detect such out of focus images which will be of a known size and shape (generally circular spots of known width).

This can enable distant laser threats to be readily distinguished from nearby bright objects, whilst also protecting the pixel array from powerful laser sources (because the laser energy is not focussed to a point on the pixel array it is less likely to damage the pixel array). It can also enable the wavelength of the laser to be accurately determined from the ratio of colours in the image of the laser spot, because it will typically not be a saturated image.

The apparatus and method are particularly suitable for identifying and distinguishing laser sources across a wide range of brightnesses, and is also suitable for detecting and distinguishing multiple laser sources.

Further embodiments are set out in the claims.

The invention claimed is:

1. A laser detector comprising:
a forward facing array of sensor elements, and a lens arrangement positioned in front of the sensor array;
a computer processor arranged to receive image data from the sensor array and to determine from the received data the presence of light from a laser source, based at least in part on the brightness of pixels in the image data;
wherein:
the lens arrangement is positioned relative to the array of sensor elements such that:
any substantially point-like distal light sources where incoming light rays are substantially parallel give rise to a characteristic out of focus image that spans at least eight pixels in the plane of the array of sensor elements;
the computer processor is arranged to process the received image data to identify the characteristic out of focus image in the image data, and to disregard different images that are a different size and their associated light sources; and
the forward facing array of sensor elements is provided as a bayer type sensor having different regions devoted to different wavebands, and the laser detector is arranged to measure the wavelength of the substantially point-like distal light source solely from inside the characteristic out of focus image.

2. The laser detector of claim 1 wherein the lens arrangement is arranged to provide an out of focus image at the sensor array from light sources at substantially optical infinity, and to provide an in-focus image at the sensor array from proximal light sources at a predetermined proximal distance.

3. The laser detector of claim 1 wherein the lens arrangement is arranged to provide an out of focus image at the sensor array from light sources at substantially optical infinity, and to provide an even more out of focus image at the pixel array from more proximal light sources.

4. The laser detector of claim 1, wherein the characteristic image shape is substantially a circular spot.

5. The laser detector of claim 1, wherein the optical density of the lens arrangement, the lens aperture diameter, the sensor efficiency, and the size and light gathering capacity of its sensor elements, and the image bit depth and any ISO applied, provide for an image value at a value below 10% of the image bit depth in the case of imaging a surface with a luminance of 10 kcd/m$^2$ or above in the direction of the camera.

6. The laser detector of claim 5 wherein the value is zero.

7. The laser detector of claim 1 wherein the image is provided as a binary image.

8. The laser detector of claim 1 comprising an optical density filter.

9. The laser detector of claim 8 wherein the optical density filter has an optical density of at least 4.

10. The laser detector of claim 1 wherein the lens arrangement includes a colour splitter.

11. A method of detecting a laser comprising the steps of:
providing a forward facing array of sensor elements, and a lens arrangement positioned in front of the sensor array;
providing a computer processor and controlling the computer processor to receive image data from the sensor array and to determine from the received data the presence of light from a laser source, based at least in part on the brightness of pixels in the image data;
wherein:
the lens arrangement is positioned relative to the array of sensor elements such that:
any substantially point-like distal light sources where incoming light rays are substantially parallel give rise to a characteristic out of focus image that spans at least eight pixels in the plane of the array of sensor elements;
the computer processor is controlled to process the received image data to identify the characteristic out of focus image in the image data, and to disregard different images that are a different size and their associated light sources; and
the forward facing array of sensor elements is provided as a bayer type sensor having different regions devoted to different wavebands, and the laser detector is arranged to measure the wavelength of the substantially point-like distal light source solely from inside the characteristic out of focus image.

* * * * *